United States Patent Office 3,691,011
Patented Sept. 12, 1972

3,691,011
LOADING DEVICE FOR FUEL ELEMENTS AND CONTROL RODS IN A NUCLEAR REACTOR
Joachim Krüger, Hans-Peter Schabert, Franz Schubert, and Robert Weber, Erlangen, Germany, assignors to Siemens Aktiengesellschaft, Berlin and Munich, Germany
Filed Oct. 30, 1968, Ser. No. 771,898
Int. Cl. G21c 19/10
U.S. Cl. 176—30    16 Claims

ABSTRACT OF THE DISCLOSURE

Loading device for fuel elements and control rods in a nuclear reactor includes a vertically travelling double manipulator having respectively an independently actuable control rod manipulator and fuel element manipulator.

---

Figures 1, 2:
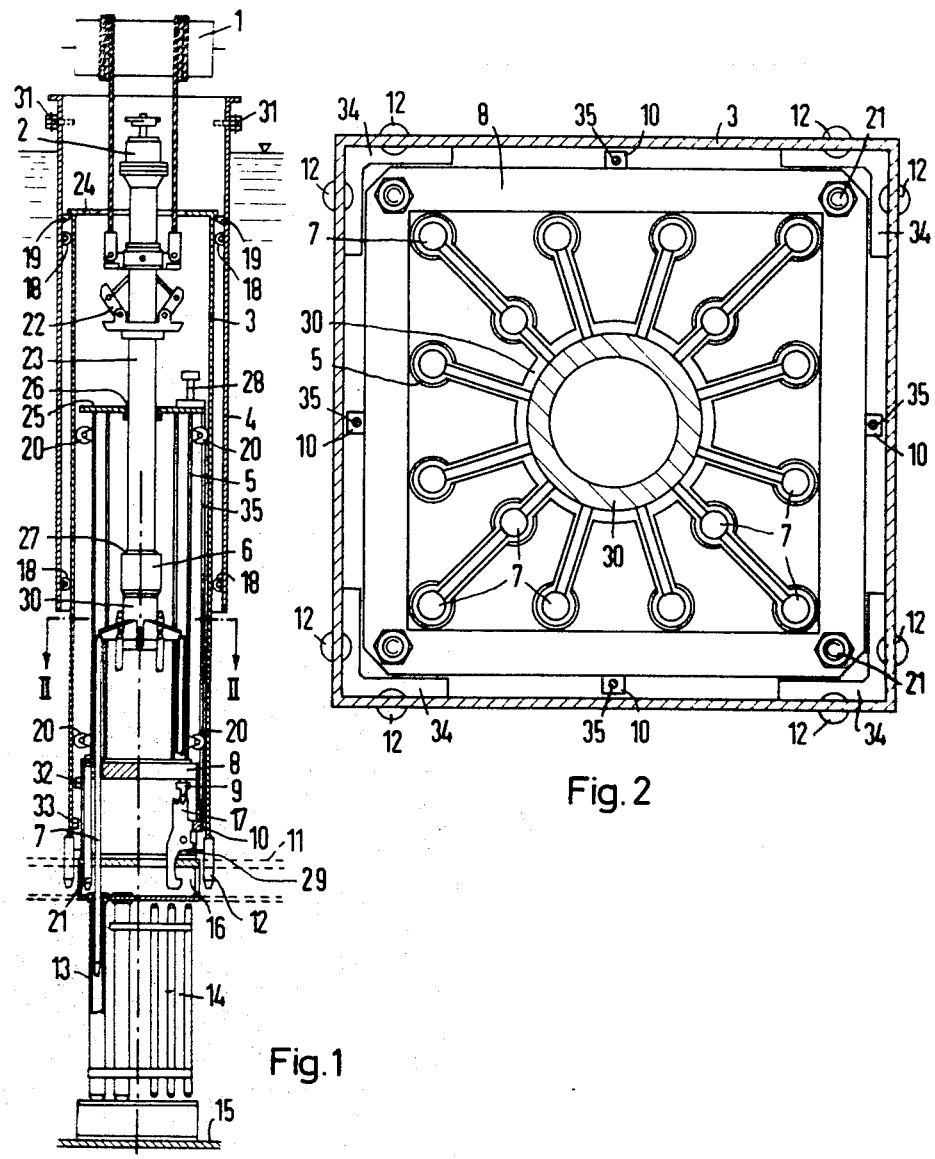

Our invention relates to a loading device for fuel elements and control rods in a light water reactor and, more particularly, one having a telescoping tool.

In the normally annual fuel element exchange occurring in light water reactors, a predetermined number of fuel elements are transported from the reactor core into the fuel element storage frame in the fuel element storage vessel and are replaced by new fuel elements. Then the rest of the fuel elements remaining in the reactor core must be shifted or transposed. Furthermore, it is also necessary to transport and transpose a predetermined number of control rods.

The reactor is shut down and depressurized before the fuel element exchange proper. By disassembling the pressure vessel cover and removal of various built-in components, the reactor core is made accessible from the top thereof. Simultaneously, by flooding the reactor chamber adequate water-shielding is provided for the freely disposed reactor core. A manipulator bridge with a manipulator suspended in a guiding mast can then be caused to travel over the flooded fuel element storage receptacle and the reactor chamber so that each position within the storage frame and the reactor core can be reached with the aid of a positioning system adjusted in accordance with coordinates.

In reactors with finger control rods having absorption tubes extending into guide tubes distributed over the fuel element cross section, the finger control rods are seated in the fuel elements when the reactor is shut down. However, only part of the fuel elements contained in the reactor core is provided with finger control rods. In the remaining fuel elements, the control rod guiding tubes are closed by throttling members. The control rods are thereby positioned firmly in coordination with the reactor core.

In the course of a fuel element exchange, a specific number of burnt-up fuel elements, also partly containing control rods, are transported from the reactor core into the fuel element storage frame in the storage receptacle, and are replaced by new fuel elements contained in the storage frame. The control rods, which have a considerable longer useful life than the fuel elements, must then be removed from the burnt-up fuel elements and placed in the respective new fuel elements. Since the rest of the fuel elements remaining in the reactor core are transposed or shifted inside the core, whereby fuel elements with control rods are placed at positions which do not have any control rods, a specific number of control rods must be also retransposed into the original position coordinated therewith.

According to a heretofore known proposal, the control rods are transposed from fuel element to fuel element with the aid of a control rod exchange station located in the fuel element storage container. This requires, however, that both the fuel element with the control rod as well as the fuel element which is to receive this fuel rod must first be transported to the exchange station and after the consequent transposing operation must be returned to the fuel element storage frame or to the reactor core. This however results in relatively great travel distances and a relatively greater number of lifting operations, which requires an increase in the fuel element exchange affecting downtime of the nuclear power plant.

It is accordingly an object of our invention to provide loading device for fuel elements and control rods in a nuclear reactor which permits direct transposition of control rods within the reactor core or within the fuel element storage frame vicinity without having to use a separate exchange station.

It is a further object of the invention to provide such loading device by which the fuel elements can be transported either with or without control rods or, control rods alone can be transported.

With the foregoing and other objects in view, we provide loading device for fuel elements and control rods in a nuclear reactor comprising a vertically travelling double manipulator having respectively and independently actuable control rod manipulator and fuel element manipulator.

By employing such a double manipulator having respectively a separate control rod manipulator and fuel element manipulator, it is thus possible both to transport and transpose fuel elements alone as well as fuel elements with control rods still remaining therein.

In accordance with a further feature of the invention, the double manipulator is located within a guiding mast secured to a manipulator bridge.

In accordance with still another feature of the invention, a fuel element manipulator head is combined, into the structural unit, with control rod guide inserts located above the manipulator head and formed of tubes slotted radially to the longitudinal axis of the manipulator.

For the raising motion of the fuel element manipulator, the upper ends of the control rod guide tubes are provided with a horizontal support plate having a center bore for the control rod manipulator bar, the support plate being disposed on a shoulder of the control rod manipulator head as the fuel element manipulator is vertically displaced. The fuel element manipulator head is thereby, together with the control rod guide frame, telescopically capable of travelling in a centering bell which is itself displaceable in the guiding mast. The guiding mast together with the centering bell and the double manipulator are rotatable about the longitudinal axis of the guiding mast.

To accurately establish the position of the centering bell, it is provided at the lower end thereof with centering pins, in accordance with an additional feature of the invention, which are driven into the elements adjacent an element which is being withdrawn.

To maintain a predetermined minimum safe clearance from the surface of the water of the flooded reactor core, both for fuel elements and control rods that are being withdrawn, the control rod manipulator bar is provided at the upper end thereof with a horizontal outwardly swingable auxiliary lever for limiting the upward travel in the centering bell and for mechanically arresting it, when the manipulator head is closed.

In order moreover to prevent a faulty actuation of the control rod manuipulator head and of the fuel element manipulator head, both manipulator heads, in accordance with yet another feature of the invention, are electrically latched with respect to one another in such a way that only one of the manipulator heads can be closed. To additionally latch the fuel element manipulator head, this manipulator head is provided with pawls pivotable about a horizontal axis, said pawls being in turn provided at the free end thereof with mechanical ratchets for arresting the same in the open or closed condition thereof.

To control the raising and lowering motion of the fuel elements and control rods in the core or storage frame vicinity, there is furthermore provided, in accordance with the invention, a load indicator with automatic means for cuttng off the drive for the raising mechanism when the load is exceeded or is below a given value, so as to thereby prevent damage to the fuel elements or the control rods due to jamming thereof or due to the fact that they remain suspended as they are being moved into or out of the core or the storage frame.

To inspect the fuel elements gripped by the manipulator, the centering bell is provided, according to still another feature of the invention, with lateral perforations at the level at which the spacers are located when the fuel element is completely inserted.

Furthermore, an endoscope adjustable in respect to the object spacing is rigidly mounted on the manipulator bridge for the purpose of inspecting the fuel elements or finger control rods downwardly displaced out of the centering bell, which is rigidly retained in the guiding tube by means of a pivotable detent. The fuel elements or control rods are caused to travel past the objective of the endoscope and are rotated so that they can be inspected from all sides and over the entire length thereof.

The fuel element and control rod manipulators are actuated, in accordance with additional features of the invention, by compressed air for opening the same and by compression springs when closing the same. Thus, for closed manipulators, a residual pressure is maintained in the compressed air cylinders and conduits, which is greater than the pressure corresponding to that of the maximum water depth. Consequently, in the event of a leak, air escapes from the cylinders and conduits into the surrounding water so that such defects can be readily determined.

Other features which are considered as characteristic for the invention are set forth in the appended claims.

Although the invention is illustrated and described herein as embodied in loading device for fuel elements and control rods in a nuclear reactor, it is nevertheless not intended to be limited to the details shown, since various modifications and structural changes may be made therein without departing from the spirit of the invention and within the scope and range of equivalents of the claims.

The construction of the device of the invention and method of operation thereof, however, together with additional objects and advantages thereof will be best understood from the following description of specific embodiments when read in connection with the accompanying drawings, in which:

FIG. 1 is a longitudinal sectional view of the double manipulator constructed in accordance with our invention showing a control rod partly withdrawn from the reactor core; and FIG. 2 is a much enlarged cross-sectional view taken along the line II—II, as shown in FIG. 1.

Referring now to the drawing, and first particularly to FIG. 1 thereof, there is shown a double manipulator which includes an outer guiding mast 4 that is connected to a nonillustrated manipulating bridge located above the loading device of our invention. A centering bell 3 is capable of travelling telescopically in the guiding mast 4. Centering pins 12 for the fuel elements 14 are provided at the lower end of the centering bell 3, as shown in FIG. 1. The double manipulator proper is capable of travelling within the centering bell 3 by being raised and lowered from a two-cable windlass. This double manipulator also includes a control rod manipulator bar 23 carrying a control rod manipulator head 6. A fuel element manipulator 8 which, as shown in FIG. 1, is seated on a fuel element that is to be withdrawn, is provided with four pawls 17 for latching or locking with the fuel elements 14. A control rod guide insert 5 is located above the manipulator head 8 and is formed of individual guiding tubes for the finger control rods 7. The upper ends of these guiding tubes 5 are connected with a substantially horizontal plate 25 which is formed with a central bore through which the control rod manipulator bar 23 extends. The fuel element manipulator head 8 is raised when the control rod manipulator bar 23 is raised to such a height that the plate 25 abuts the shoulder 27 of the control rod manipulator head 6.

The operation of the double manipulator of our invention is as follows.

After reaching the fuel element position by means of the nonillustrated manipulating bridge, the double manipulator of the invention is lowered by the aid of the two-cable windlass. Thus, the bridge 27 of the control rod manipulator head 6 abuts the opposing flange 26 of the control rod guide insert 5, and the plate 25 abuts the flange 24 of the centering bell 3. The telescoping parts are thus disposed in their extended condition. The fuel element manipulator 8 and the control rod manipulator head 6 are in their opened position, i.e. the pneumatic actuating cylinder 2 and 28 are subjected to compressed air. The double manipulator of the invention is lowered, guided by the rollers 18 of the guiding mast 4. Just before they reach the lower limiting position, the centering pins 12 of the centering bell 3 are inserted into corresponding bores of the adjacent fuel elements 11 whereby the latter are brought into a predetermined position to the fuel elements 14 that are being withdrawn. Thereafter the flange 24 of the centering bell 3 is placed on detents 19 extending from the guiding mast 4, so that the fuel elements 11 are not subjected to a load in the axial direction by the centering bell 3. Upon being lowered farther, the control rod guide insert 5 travels downwardly with the fuel element manipulator head 8 mounted on the lower end thereof, guided by the rollers 20 within the centering bell 3.

The fine centering of the fuel element manipulator head 8 with respect to the fuel element 14 is affected by the insertion of the centering pins 21 into bores formed in the fuel element 14. Just before the fuel element manipulator head 8 is placed on the fuel element 14, the ratchet 9 is opened by the vertical upward displacement of the pin 29. The raising motion is thereby cut off. The heretofore opened manipulator latches 17 of the fuel element manipulator head 8 are closed through the actuating slider 10 and the rod 35 by means of a pneumatic cylinder 28. When the fuel element manipulator head 8 is raised, the ratchets 9 initially rest in the latches 17 and mechanically arrest the latter. Then, the head 16 of the fuel element 14 becomes positioned at the latches 17, and the fuel element 14 is raised. After the entire length of the fuel element 14 has been drawn into the centering bell 3, the latter is then raised therewith due to the abutment of the plate 25 with the flange 24 and is drawn up to the highest predetermined position in the guiding mast 4. If the means for shutting off the raising motion failed, the centering bell 3 would travel with the flange 24 until it engaged a fixed stop member located in the guiding mast. When the fuel element 14 suspended at the fuel element manipulator head 8 is to be inserted, the aforedescribed steps take place in reverse sequence.

When manipulating the control rods, the lowering steps take place exactly as for manipulating the fuel element.

After the fuel element manipulator head 8 has been placed on the fuel element head 16, the double manipulator is further lowered. Thereby the flange 27 of the control rod manipulator 6 is separated from its engagement with the opposing flange 26 of the control rod guide insert 5 and travels downwardly within the latter until the control rod manipulator 6 becomes positioned on the control rod head 30 which is seated in the fuel element 14. After the control rod manipulator 6 is closed, due to the control rod manipulator actuating cylinder 2, the control rod manipulator 6 with the control rod 30 suspended therefrom is drawn in an upward direction. Thus, the absorption fingers 7 of the control rod 30 are withdrawn from the control rod guiding tubes 13 of the fuel element 14 and are guidingly drawn into the tubes of the control guiding insert 5.

When the control rod manipulator 6 is closed, the two auxiliary stop members 22, connected form-lockingly with the actuating rod of the control rod manipulator 6, are swung outwardly. After the absorption fingers 7 of the control rod 30 have been completely drawn into the control rod guide insert 5, the shoulder 27 abuts the opposing flange 26 and raises the control rod guide insert 6 with the fuel element manipulator head 8. After a short travel distance, the auxiliary stop members 22 come into engagement with the flange 24 of the centering bell 3 and raise the latter therewith. Then, the control rod manipulator 6 is form-lockingly arrested in the locked position thereof. After the centering bell 3 has reached the predetermined highest position thereof within the guiding mast 4, the raising movement is stopped.

Control rod manipulator 6 and control rod guide insert 5 with fuel element manipulator head 8 then are located in a low position relative to the centering bell 3, as for the fuel element manipulating operation, because instead of the flange 25, the auxiliary stop members 22 lie up against the flange 24 of the centering bell 3. The control rod 7 is thereby located in the same elevated position as a withdrawn fuel element. Adequate water-shielding is thereby also assured for the withdrawn control rod, because the centering bell 3 accounts for the upper limit of the raising travel distance.

The aforedescribed raising or lifting operation is carried out initially for inspecting a fuel element or a control rod. Then, auxiliary stop members 31 that are pivotally mounted on the guiding mast 4 are swung into the guiding mast 4. When the double manipulator of the invention is lowered thereafter, the flange 24 of the centering bell 3 comes into engagement with the auxiliary stop members 31. Upon further lowering of the double manipulator, the fuel element travels out of the centering bell 3 to the stop member 32 located on the control rod guide insert 5, the stop member 32 coming into engagement with stop member 33 located on the centering bell 3.

An underwater endoscope located a predetermined distance from the guiding mast 4 and having an objective head seated at a level below the lower end of the guiding mast 4, as viewed in FIG. 1, serves for inspecting the fuel element freely extending out of the guiding mast 4 and the centering bell 3. By raising and lowering the fuel element, it can be inspected along the entire length thereof. By turning the guiding mast 4, the two-cable windlass 1 being mounted so as to be turnable therewith, the fuel element can be inspected on all sides thereof.

The inspection or examination of a control rod occurs principally in the same manner and is of importance particularly in regard to repeated inspections. The spacing of the objective head from the fuel element or control rod is varied by swinging the endoscope about its suspension point. Due to the relatively great length of the endoscope, the required angle of swing is very small so that the line of sight is changed only negligibly.

By arranging the endoscope on the manipulator bridge with rigid coordination thereof with the double manipulator of the invention, whereby the endoscope carries out the same travel movements as the manipulator bridge, the inspection of fuel elements or control rods can be carried out at a selected spot within the travel limits of the manipulator bridge, provided that sufficient space is available for lowering the fuel element or control rod.

Therefore, with the loading device of our invention, a separate inspection station, which would require a greater number of travel and lifting movements, is not necessary. The inspection can be effected in the course of the normal fuel element and control rod exchange operations with consequent saving of time. Instead of an endoscope, one can also obviously employ a conventional underwater television camera.

Since the fuel element manipulator head 8 and the control rod manipulator 6 are opened by compressed air, and are closed by compression springs when the actuating cylinders 2 and 28 are depressurized, a compressed air tube is required as supply conduit respectively for the cylinders 2 and 28. To supply diverse underwater limit switches at both manipulators a respective leading-in cable is furthermore provided.

In view of the various raising movements of the double manipulator of our invention, these tubes and cables must be stored; the tube and cable of the control rod manipulator 6 must be wound up separately from those of the fuel element manipulator head 8 because of the different telescoping raising movements.

Instead of the conventionally known tube and cable winding drums, with which the supply of compressed air is effected through a movable seal and the electric current supply is provided through slip rings, storage devices operating on the principle of a block and tackle are employed in accordance with our invention. The tube or cable is thus passed over deflecting or reversing rollers disposed in a fixed upper position, and over lower rollers located in a lower roller housing or pulley case. The pulley case carries out a reduced raising movement in accordance with the number of reversals or deflections of the tube or cable. If the lifting movements of the tube and cable are identical, they can be stored on a common winding device.

This type of storage further affords the advantage that the supply of electric current and compressed air is effected over firm connections, free of abrasion. As aforedescribed, the closing of the manipulator, with the actuating cylinder depressurized, is effected by compression springs, so that the manipulator cannot otherwise open by a loss of compressed air as, for example, in the event of a tear in the compressed air supply tube. The actuating cylinders are not fully depressurized, however, but rather, a residual pressure somewhat greater than that of the corresponding maximal water depth remains in the cylinders.

Consequently, when leaks occur in the compressed air system lying underwater, no water can enter the system, but rather, air discharges therefrom. As a result, such leaks can be detected by the rising air bubbles. Furthermore, contamination of the compressed air system by contaminated water penetrating into the same is avoided.

The fuel elements carry spacer structures, the position thereof on the fuel element being fixed. By providing lateral openings in the centering bell at the locations at which these spacers are disposed when the fuel element is withdrawn, the positions of these spacers can be visually controlled for each fuel element being withdrawn.

We claim:

1. Loading device for fuel elements and control rods in a nuclear reactor comprising a manipulator bridge, a guiding mast secured thereto and located above the reactor core, a centering bell for the fuel elements displaceably mounted within said guiding mast, a vertically travelling double manipulator in the form of a single structural entity disposed in said guiding mast and having respectively an independently actuable control rod manipulator and fuel element manipulator having a clamping head, a control rod guide insert located above and firmly connected to said clamping head, said control rod manipulator being mounted at the lower end of a vertically extending shaft and being formed with a shoulder, said control rod guide insert having at the upper end thereof a substantially horizontal support plate formed with a central bore through which said control rod manipulator shaft extends, said clamping head and said control rod guide insert therewith as well as said control rod manipulator shaft being telescopically displaceable in said centering bell so that, in lowering condition of said control rod manipulator, said support plate is abuttable with said shoulder of said control rod manipulator and, in rising condition of said control rod manipulator said fuel element manipulator is entrainable by said control rod manipulator.

2. Loading device according to claim 1, wherein said control rod guide insert comprises a plurality of slotted tubes disposed radially to the longitudinal axis of said double manipulator and adapted to receive control rods respectively therein.

3. Loading device according to claim 1, wherein said guiding mast is rotatable about the longitudinal axis thereof together with said centering bell and said double manipulator.

4. Loading device according to claim 1 including centering pins located at the lower end of said centering bell for centering the same with respect to fuel elements disposed adjacent to the fuel element being serviced by the loading device.

5. Loading device according to claim 1, wherein said control rod manipulator has a clamping head, and including a lever mounted at the upper end of said control rod manipulator shaft, said lever being swingable outwardly to a substantially horizontal position, in closed condition of said control rod clamping head, for limiting the upward movement of said control rod manipulator at said support plate in said centering bell and for mechanically arresting said control rod clamping head.

6. Loading device according to claim 1, including ratchets pivotable on said fuel element clamping head about a substantially horizontal axis, and mechanical pawls disposed at the free ends of said ratchets and engageable therewith for arresting said fuel element clamping head in opened or closed condition thereof.

7. Loading device according to claim 1, including electric latching means for said control rod manipulator and said fuel element manipulator effective for closing only one of the two manipulators.

8. Loading device according to claim 1, wherein the fuel element is provided with spacers, and said centering bell is formed with lateral perforations at a level at which said spacers are located in the fully inserted condition of the fuel element in the reactor core.

9. Loading device according to claim 1, including a pivotable stop member mounted on said guiding mast for fixedly holding said centering bell in a raised position, and an endoscope fixedly mounted on said manipulator bridge and swingingly adjustable at a suspension point with respect to variation in spacing of the object, said endoscope being adapted to inspect a downwardly displaced fuel element or finger control rod in said raised position of said centering bell.

10. Loading device according to claim 1, including drive means for raising and lowering said double manipulator, and means for controlling the raising and lowering movement of the fuel elements and the control rods comprising a load indicator and automatic switch means for switching off said double manipulator drive means when the load is greater than or less than a given value.

11. Loading device according to claim 1, inclding compressed air means for opening said manipulators, and compression spring means for closing said manipulators.

12. Loading device according to claim 11, wherein the reactor is shielded by water at a given level and said compressed air means comprises compressed air cylinders and supply conduits connected thereto, said cylinders and said conduits, in closed condition of said manipulators, having a given residual pressure of air therein, and including an underwater limit switch and plugs having a similar given residual pressure of air in the interior thereof, said given residual pressure of air being greater than the pressure of the shielding water at the given level thereof.

13. Loading device according to claim 1, including two-cable windlass means for displacing said double manipulator in vertical direction.

14. Loading device according to claim 1, comprising compressed air and electrical supply lines connected to said control rod and fuel element manipulators, and a winding device similar to a block and tackle for winding up said supply lines.

15. Loading device according to claim 1, including a fixed mechanical stop member for limiting upward movement of said double manipulator.

16. Loading device according to claim 1, wherein said control rod manipulator has a clamping head adapted to insert in a fuel element both control rods and throttling frames, neutron sources and trimming rods having heads similar in shape to that of the control rods.

References Cited

UNITED STATES PATENTS

| 2,756,858 | 7/1956 | Kasschau | 176—31 |
| 3,158,544 | 11/1964 | Long et al. | 176—32 |
| 3,186,914 | 6/1965 | Webb et al. | 176—33 |
| 3,388,942 | 6/1968 | Johnson et al. | 176—30 X |
| 3,421,635 | 1/1969 | Bunger | 176—30 X |

CARL D. QUARFORTH, Primary Examiner

E. E. LEHMANN, Assistant Examiner

U.S. Cl. X.R.

176—36 R; 214—18 N